US008931286B2

(12) United States Patent
Watanabe et al.

(10) Patent No.: US 8,931,286 B2
(45) Date of Patent: Jan. 13, 2015

(54) HEAT EXCHANGER AND THERMOACOUSTIC DEVICE USING THE SAME

(75) Inventors: Yoshiaki Watanabe, Kyoto (JP); Shinichi Sakamoto, Osaka (JP)

(73) Assignee: The Doshisha, Kyoto-shi (JP)

( * ) Notice: Subject to any disclaimer, the term of this patent is extended or adjusted under 35 U.S.C. 154(b) by 2108 days.

(21) Appl. No.: 11/662,252

(22) PCT Filed: Apr. 22, 2005

(86) PCT No.: PCT/JP2005/007684

§ 371 (c)(1),
(2), (4) Date: Mar. 9, 2007

(87) PCT Pub. No.: WO2006/073005

PCT Pub. Date: Jul. 13, 2006

(65) Prior Publication Data

US 2007/0261839 A1 Nov. 15, 2007

(30) Foreign Application Priority Data

Jan. 7, 2005 (JP) ................................ 2005-002619

(51) Int. Cl.
*F25B 9/00* (2006.01)
*B01D 8/00* (2006.01)
*F28D 15/00* (2006.01)
*F25B 9/14* (2006.01)

(52) U.S. Cl.
CPC ................ *F28D 15/00* (2013.01); *F25B 9/145* (2013.01); *F02G 2243/54* (2013.01); (Continued)

(58) Field of Classification Search
USPC ................. 62/6, 55.5; 165/4, 10; 60/517, 520
See application file for complete search history.

(56) References Cited

U.S. PATENT DOCUMENTS 4,901,787 A * 2/1990 Zornes .............................. 165/4

(Continued)

FOREIGN PATENT DOCUMENTS

JP 10-68556 A 3/1998
JP 2000-088378 * 3/2000 ................ F25B 9/00

(Continued)

OTHER PUBLICATIONS

International Search Report of PCT/JP2005/007684, date of mailing Jul. 19, 2005.

*Primary Examiner* — Frantz Jules
*Assistant Examiner* — Keith Raymond
(74) *Attorney, Agent, or Firm* — Westerman, Hattori, Daniels & Adrian, LLP

(57) ABSTRACT

A thermoacoustic device 1 for improving heat exchange efficiency is provided which has a first stack 3*a* including stack constituent elements 3*e*L and 3*e*H laminated together, and a first high-temperature side heat exchanger 4 and a first low-temperature side heat exchanger 5, which are provided at two ends of the first stack 3*a*, in which a self-excited acoustic wave is generated by a temperature difference between the first high-temperature side heat exchanger 4 and the first low-temperature side heat exchanger 5 and is then converted to thermal energy in a stack 3*b* provided between a second high-temperature side heat exchanger 6 and a second low-temperature side heat exchanger 7. Between the first high-temperature side heat exchanger 4 and the first low-temperature side heat exchanger 5, and between the second high-temperature side heat exchanger 6 and the second low-temperature side heat exchanger 7, a stack constituent element 3*e*L having a low thermal conductivity, a stack constituent element 3*e*H having a high thermal conductivity, and a stack constituent element 3*e*L having a low thermal conductivity are provided in that order.

6 Claims, 6 Drawing Sheets

(52) U.S. Cl.
CPC .. *F25B 2309/003* (2013.01); *F25B 2309/1403* (2013.01); *F25B 2309/1405* (2013.01); *F25B 2309/1416* (2013.01)
USPC .................................................. 62/6; 62/55.5

(56) References Cited

U.S. PATENT DOCUMENTS

| | | | | | |
|---|---|---|---|---|---|
| 5,165,243 | A | * | 11/1992 | Bennett | 62/6 |
| 6,032,464 | A | * | 3/2000 | Swift et al. | 60/520 |
| 6,131,644 | A | * | 10/2000 | Kohara et al. | 165/10 |
| 2004/0000150 | A1 | * | 1/2004 | Symko et al. | 62/6 |

FOREIGN PATENT DOCUMENTS

| | | | |
|---|---|---|---|
| JP | 2000-88378 | A | 3/2000 |
| JP | 2002-31423 | A | 1/2002 |
| JP | 2002-535597 | A | 10/2002 |
| JP | 2004-28389 | A | 1/2004 |
| JP | 2004-198020 | A | 7/2004 |
| WO | WO 00-43639 | A1 | 7/2000 |

* cited by examiner

HEAT EXCHANGER AND THERMOACOUSTIC DEVICE USING THE SAME

TECHNICAL FIELD

The present invention relates to a thermoacoustic device capable of cooling an object to be cooled or of heating an object to be heated using a thermoacoustic effect, and more particularly, relates to a heat exchanger and a thermoacoustic device using the same, the heat exchanger being designed to improve conversion efficiency from thermal energy to acoustic energy or from acoustic energy to thermal energy.

BACKGROUND ART

Heat exchange devices using an acoustic effect have been disclosed, for example, in the following Patent Documents 1 and 2.

First, the device disclosed in Patent Document 1 relates to a cooling device using a thermoacoustic effect, in which a first stack provided between a high-temperature side heat exchanger and a low-temperature side heat exchanger, a regenerator (second stack) provided between a high-temperature side heat exchanger and a low-temperature side heat exchanger, and the high-temperature side heat exchanger at the first stack side are heated to generate self-excited standing and traveling waves, and by the standing and traveling waves, the low-temperature side heat exchanger at the regenerator side is cooled.

In addition, in Patent Document 2, as a stack of the thermoacoustic device as described above, the structure of a stack has been disclosed in which porous plates and o-rings are alternately disposed in a heat transportation direction. According to this Patent Document 2, in this stack, the porous plates are composed of a material having a high thermal storage effect, and air layers each formed of adjacent porous plates and an o-ring are composed of a material having a low thermal conductivity so as to suppress heat transportation in a direction opposite to the heat transporting direction and so as to store heat along wall surfaces of the porous plates. Furthermore, in this Patent Document 2, as another embodiment of the stack, the structure has been disclosed in which discs having a high heat storage effect and discs having a low thermal conductivity are alternately disposed.

[Patent Document 1] Japanese Unexamined Patent Application Publication No. 2000-88378

[Patent Document 2] Japanese Unexamined Patent Application Publication No. 10-68556

DISCLOSURE OF INVENTION

Problems to be Solved by the Invention

However, since the stack used in the above Patent Document 2 has the structure in which stack elements having a high heat storage effect are provided at two ends, and therebetween, stack elements having a high heat storage effect and stack elements having a low thermal conductivity are alternately disposed, the following problems arise.

That is, a high-temperature side heat exchanger and a low-temperature side heat exchanger are provided at the two end portions of the stack; however, when the stacks having a high heat storage effect are provided at the high-temperature side heat exchanger side and the low-temperature side heat exchanger side, heat of the high-temperature side heat exchanger and that of the low-temperature side heat exchanger are stored in the stacks, and as a result, heat exchange with a working fluid cannot be properly performed. In particular, in the case in which the high-temperature side heat exchanger is heated to several hundreds of degrees, by the stack at the high-temperature side heat exchanger side, heat exchange cannot be performed with a working fluid. Furthermore, when the stacks having a high heat storage effect are provided in close contact with the high-temperature side heat exchanger side and the low-temperature side heat exchanger side, heat of the high-temperature side heat exchanger is transported to the low-temperature side heat exchanger side via the stacks having a high heat storage effect, and as a result, the temperature of the low-temperature side heat exchanger may be increased in some cases. Hence, when the temperature of the low-temperature side heat exchanger is increased as described above, the temperature gradient between the high-temperature side heat exchanger and the low-temperature side heat exchanger is decreased, and an acoustic wave cannot be rapidly generated from a communication path, so that the heat exchange efficiency is degraded.

Accordingly, the present invention has been conceived in consideration of the problems described above, and an object of the present invention is to provide a heat exchanger having a stack which can improve heat exchange efficiency and a thermoacoustic device using the above heat exchanger.

Means for Solving the Problems

In order to achieve the above object, in accordance with one aspect of the present invention, there is provided a heat exchanger which has: a stack including stack constituent elements which are laminated together; a high-temperature side heat exchanger provided at one end of the stack; and a low-temperature side heat exchanger provided at the other end of the stack, in which a temperature gradient is generated in communication paths of the stack by a temperature difference generated between the high-temperature side heat exchanger and the low-temperature side heat exchanger, and an acoustic wave is generated from the stack. In the thermoacoustic device described above, stack constituent elements having a low thermal conductivity form two ends of the stack, and a stack constituent element having a relatively high thermal conductivity is provided between the stack constituent elements having a low thermal conductivity.

According to the structure described above, since the stack constituent elements having a low thermal conductivity form the two ends of the stack, heat transportation from the high-temperature side heat exchanger to the low-temperature side heat exchanger side via the stack can be suppressed, and hence the temperature difference between the high-temperature side heat exchanger and the low-temperature side heat exchanger can be increased. As a result, standing and traveling waves are rapidly generated by increasing the temperature gradient, and hence the heat exchange efficiency can be improved.

In addition, in accordance with another aspect of the present invention, there is provided a heat exchanger which has: a stack including stack constituent elements which are laminated together; a high-temperature side heat exchanger provided at one end of the stack; and a low-temperature side heat exchanger provided at the other end of the stack, in which a temperature gradient is generated between the high-temperature side heat exchanger and the low-temperature side heat exchanger by inputting an acoustic wave in the stack, and heat is output outside from the high-temperature side heat exchanger or the low-temperature side heat exchanger. In the thermoacoustic device described above, stack constituent elements having a low thermal conductivity form two ends of the stack, and a stack constituent element having a relatively high thermal conductivity is provided between the stack constituent elements having a low thermal conductivity.

According to the structure described above, when acoustic energy is converted to thermal energy, high heat is prevented from being transported from the high-temperature side heat exchanger side to the low-temperature side heat exchanger side, and a cooling temperature of the low-temperature side heat exchanger can be decreased, so that an object to be cooled can be further cooled.

In addition, according to the above aspects of the present invention, the stack constituent element having a high thermal conductivity is formed to have a thickness larger than that of the stack constituent elements having a low thermal conductivity.

Accordingly, an area in which heat exchange is performed with a working fluid present in the communication paths can be increased, and an acoustic wave can be rapidly generated; hence, the heat exchange efficiency can be improved.

Furthermore, the stack constituent elements are laminated together with a holding force generated between the high-temperature side heat exchanger and the low-temperature side heat exchanger.

According to the structure described above, compared to the case in which the stack constituent elements are laminated together using an adhesive, the stack constituent elements can be easily laminated together. In particular, although communication paths having a small diameter may be blocked by an adhesive which overflows, when the stack constituent elements are simply held between the high-temperature side heat exchanger and the low-temperature side heat exchanger, the communication paths are prevented from being blocked.

In addition, as another embodiment, the stack constituent elements are laminated together by their own weights.

Accordingly, it is not necessary to hold the stack constituent elements between the high-temperature side heat exchanger and the low-temperature side heat exchanger, and hence the stack constituent elements can be easily laminated together.

In addition, the heat exchanger described above may be applied to a thermoacoustic device as describe below. That is, the above heat exchanger may be applied to a thermoacoustic device which includes in a loop tube: a first stack provided between a first high-temperature side heat exchanger and a first low-temperature side heat exchanger; and a second stack provided between a second high-temperature side heat exchanger and a second low-temperature side heat exchanger, in which self-excited standing and traveling waves are generated by heating the first high-temperature side heat exchanger, and the second low-temperature side heat exchanger is cooled by the standing and traveling waves, or in which self-excited standing and traveling waves are generated by cooling the first low-temperature side heat exchanger, and the second high-temperature side heat exchanger is heated by the standing and traveling waves. In the above thermoacoustic device, stack constituent elements having a low thermal conductivity form two ends of each of the first stack and the second stack, and a stack constituent element having a relatively high thermal conductivity is provided between the stack constituent elements having a low thermal conductivity of each of the first stack and the second stack.

Advantages

The heat exchanger according to one aspect of the present invention has: a stack including stack constituent elements which are laminated together; a high-temperature side heat exchanger provided at one end of the stack; and a low-temperature side heat exchanger provided at the other end of the stack, in which a temperature gradient is generated in communication paths of the stack by a temperature difference generated between the high-temperature side heat exchanger and the low-temperature side heat exchanger, and an acoustic wave is generated from the stack. In the above heat exchanger, stack constituent elements having a low thermal conductivity form two ends of the stack, and a stack constituent element having a relatively high thermal conductivity is provided between the stack constituent elements having a low thermal conductivity. Accordingly, heat transportation from the high-temperature side heat exchanger and the like to the low-temperature side heat exchanger side via the stack can be suppressed, and hence the temperature difference between the high-temperature side heat exchanger and the low-temperature side heat exchanger can be increased. Hence, the temperature gradient is increased, and the standing and traveling waves are rapidly generated, so that the heat exchange efficiency can be improved.

In addition, the heat exchanger according to another aspect of the present invention has: a stack including stack constituent elements which are laminated together; a high-temperature side heat exchanger provided at one end of the stack; and a low-temperature side heat exchanger provided at the other end of the stack, in which a temperature gradient is generated between the high-temperature side heat exchanger and the low-temperature side heat exchanger by inputting an acoustic wave in the stack, and heat is output outside from the high-temperature side heat exchanger or the low-temperature side heat exchanger. In the above heat exchanger, stack constituent elements having a low thermal conductivity form two ends of the stack, and a stack constituent element having a relatively high thermal conductivity is provided between the stack constituent elements having a low thermal conductivity. Accordingly, when acoustic energy is converted to thermal energy, heat transportation from the high-temperature side heat exchanger side to the low-temperature side heat exchanger side via the stack can be prevented. Hence, a cooling temperature of the low-temperature side heat exchanger can be decreased, and an object to be cooled can be further cooled.

BEST MODE FOR CARRYING OUT THE INVENTION

Hereinafter, a first embodiment of a thermoacoustic device 1 according to the present invention will be described with reference to figures.

As shown in FIG. 1, the thermoacoustic device 1 of this embodiment includes a loop tube 2 having an approximately rectangular shape as a whole, and in this loop tube 2, there are provided a first heat exchanger 300, which is composed of a first high-temperature side heat exchanger 4, a first low-temperature side heat exchanger 5, and a first stack 3*a*, and a second heat exchanger 310, which is composed of a second high-temperature side heat exchanger 6, a second low-temperature side heat exchanger 7, and a second stack 3*b*. By heating the first high-temperature side heat exchanger 4 at the first heat exchanger 300 side, self-excited standing and traveling waves are generated, and by transporting acoustic energy by the standing and traveling waves to the second heat exchanger 310 side, the acoustic energy is converted to thermal energy at the second heat exchanger 310 side, so that the second low-temperature side heat exchanger 7 is cooled.

In this embodiment, in order to decrease the time for generating the standing and traveling waves by increasing the difference in temperature between the first high-temperature side heat exchanger 4 and the first low-temperature side heat exchanger 5, the first stack 3*a* is divided in a direction perpendicular to an axial direction of the loop tube to form three layers, that is, a stack constituent element 3*e*L having a low thermal conductivity, a stack constituent element 3*e*H having a high thermal conductivity, and a stack constituent element 3*e*L having a low thermal conductivity, which are disposed in that order from the first high-temperature side heat exchanger 4 side. In addition, in order to more efficiently convert the acoustic energy based on the self-excited standing and traveling waves to the thermal energy, as is the case described above, in the second stack 3*b* side, a stack constituent element 3*e*L having a low thermal conductivity, a stack constituent element 3*e*H having a high thermal conductivity, and a stack constituent element 3*e*L having a low thermal conductivity are disposed in that order from the second high-temperature side heat exchanger 6 side. Hereinafter, a particular structure of this thermoacoustic device 1 will be described in detail.

The loop tube 2 forming the thermoacoustic device 1 is formed of a pair of straight tube portions 2*a* and connection tube portions 2*b* connecting therebetween so as to form a closed curved line. Those straight tube portions 2*a* and the connection tube portions 2*b* are formed of metal pipes; however, a material is not limited to a metal, and for example, a transparent glass or resin may also be used. When a transparent glass or resin is used, in an experiment or the like, the positions of the first stack 3*a* and the second stack 3*b* can be easily confirmed, and the state in the tube can be easily observed.

In addition, in the loop tube 2 thus formed, there are provided the first heat exchanger 300, which is composed of the first high-temperature side heat exchanger 4, the first low-temperature side heat exchanger 5, and the first stack 3*a*, and the second heat exchanger 310, which is composed of the second high-temperature side heat exchanger 6, the second low-temperature side heat exchanger 7, and the second stack 3*b*.

The first high-temperature side heat exchanger 4 and the first low-temperature side heat exchanger 5 are both formed, for example, of a metal having a large heat capacity, and as shown in FIG. 3, communication paths 30 having a small diameter are provided inside each of the heat exchangers along the axial direction of the loop tube 2. Of the heat exchangers 4 and 5, the first high-temperature side heat exchanger 4 is mounted so as to be in contact with an upper surface of the stack 3*a* and is heated, for example, to approximately 600° C. by an electric power supplied from the outside. Alternatively, besides the electric power, this first high-temperature side heat exchanger 4 may be heated by waste heat or unused energy.

In addition, as is the case described above, the first low-temperature side heat exchanger 5 is mounted so as to be in contact with a lower surface of the first stack 3*a* and is set to a temperature, such as 15 to 16° C., which is relatively lower than that of the first high-temperature side heat exchanger 4, by circulating water or the like in an outer peripheral portion of the first low-temperature side heat exchanger 5.

The first stack 3*a* provided between the first high-temperature side heat exchanger 4 and the first low-temperature side heat exchanger 5 has a cylindrical shape in contact with the inside wall surface of the loop tube 2 and, as shown in FIG. 3, is formed of the stack constituent elements 3*e*L and 3*e*H which are laminated together and which have different thermal conductivities. Those stack constituent elements 3*e*L and 3*e*H are formed using a material, such as a ceramic, a sintered metal, a metal mesh, or a metal nonwoven cloth, and the stack constituent element 3*e*L having a low thermal conductivity, the stack constituent element 3*e*H having a high thermal conductivity, and the stack constituent element 3*e*L having a low thermal conductivity are disposed in that order from the first high-temperature side heat exchanger 4 side. Of the stack constituent elements 3*e*L and 3*e*H, the stack constituent element 3*e*H having a high thermal conductivity is formed thicker than the stack constituent element 3*e*L having a relatively low thermal conductivity, and by the structure described above, an area in which heat exchange can be performed with a working fluid is increased. Inside those stack constituent elements 3*e*L and 3*e*H, communication paths 30, which penetrate therethrough and which have a small diameter, are provided along the axial direction of the loop tube 2, as shown in FIG. 2. Those stack constituent elements 3*e*L and 3*e*H are laminated together in the top and down direction so as to be closely in contact with each other. When those stack constituent elements 3*e*L and 3*e*H are laminated together, and lamination is performed using an adhesive, an adhesive which overflows may block the communication paths 30 having a small diameter, which are provided in the stack constituent elements 3*e*L and 3*e*H. Accordingly, without using an adhesive, for example, the widths of the first high-temperature side heat exchanger 4 and the first low-temperature side heat exchanger 5 are set to be equal to a thickness width of the first stack 3*a*, and the stack constituent elements 3*e*L and 3*e*H are provided between the first high-temperature side heat exchanger 4 and the first low-temperature side heat exchanger 5 with a holding force generated therebetween. Alternatively, when the first stack 3*a* is provided in the erected straight tube portion 2*a* of the loop tube 2, the stack constituent elements 3*e*L and 3*e*H are laminated so as to be closely in contact with each other by their own weights.

In addition, the stack constituent elements 3*e*L and 3*e*H are each formed, for example, from a single material so as to obtain a constant thermal conductivity in a plane surface direction. When the thermal conductivity is nonuniform in a plane surface direction, the difference in temperature between the inside and the outside of the first stack 3*a* is generated, and thereby a nonuniform acoustic wave is generated; hence, the time for generating standing and traveling waves is delayed, and as a result, the heat exchange efficiency is degraded. Hence, the stack constituent elements 3*e*L and 3*e*H are each formed of a single material so as to obtain a constant thermal conductivity in a plane surface direction.

In addition, the first heat exchanger 300 formed of the first high-temperature side heat exchanger 4, the first low-temperature side heat exchanger 5, and the first stack 3*a*, as described above, is provided in the straight tube portion 2*a* at a position lower than the center thereof while the first high-temperature side heat exchanger 4 is disposed at an upper side. The reason the first stack 3*a* is provided at the position lower than the center of the straight tube portion 2*a* is that an acoustic wave is rapidly generated using an ascending air current which is generated when the first high-temperature side heat exchanger 4 is heated, and the reason the first high-temperature side heat exchanger 4 is provided at the upper side is that a large temperature gradient is formed from the first low-temperature side heat exchanger 5 by preventing a warm working fluid generated when the first high-temperature side heat exchanger 4 is heated from entering the communication paths 30 of the first stack 3*a*.

Next, operation of the first heat exchanger 300 thus formed will be described. First, when the first high-temperature side heat exchanger 4 of the first heat exchanger 300 is heated while the first low-temperature side heat exchanger 5 is cooled, heat is transported in the directions (axial direction) from the first high-temperature side heat exchanger 4 to the first low-temperature side heat exchanger 5. At this stage, heat at a temperature of approximately 600° C. obtained by heating in the first high-temperature side heat exchanger 4 is transported to the first low-temperature side heat exchanger 5 via the first stack 3*a*; however, the heat transportation described above is inhibited by the stack constituent elements 3*e*L having a low thermal conductivity, which are provided at end portions of the first stack 3*a*. Hence, the heat is not transported to the first low-temperature side heat exchanger 5, and as a result, the difference in temperature between the first high-temperature side heat exchanger 4 and the first low-temperature side heat exchanger 5 can be increased. In addition, the heat at a temperature of approximately 600° C. obtained by heating in the first high-temperature side heat exchanger 4 is transported to the first low-temperature side heat exchanger 5 side via a working fluid present in the communication paths 30 of the first stack 3*a*. As a result, the temperature gradient between the first high-temperature side heat exchanger 4 and the first low-temperature side heat exchanger 5 is formed, and by this temperature gradient generated in this working fluid, wobbling thereof is generated, so that an acoustic wave is generated while heat exchange is performed with the first stack 3*a*. At this stage, since large heat exchange is performed with the stack constituent element 3*e*H having a relatively high thermal conductivity, an acoustic wave is rapidly generated, and as a result, the heat exchange efficiency can be improved.

The acoustic wave thus generated is turned into the standing and traveling waves in the loop tube 2 and is transported to the second heat exchanger 310 side as acoustic energy.

This second heat exchanger 310 is formed of the second high-temperature side heat exchanger 6, the second low-temperature side heat exchanger 7, and the second stack 3*b*. The second high-temperature side heat exchanger 6 and the second low-temperature side heat exchanger 7 are both formed, for example, of a metal having a large heat capacity and are provided at two ends of the second stack 3*b*, as is the case of the first stack 3*a*, and in addition, inside the heat exchangers 6 and 7, there are provided communication paths 30 having a small diameter through which the standing and traveling waves are allowed to pass. This second high-temperature side heat exchanger 6 is set to a temperature, such as 15 to 16° C., by circulating water in an outer peripheral portion of the second high-temperature side heat exchanger 6. On the other hand, the second low-temperature side heat exchanger 7 has a heat output portion and is designed to cool an exterior object to be cooled. As the object to be cooled, for example, ambient air, a home electric appliance which generates heat, and a CPU of a personal computer may be mentioned. In addition, the second stack 3*b* has the structure similar to that of the first stack 3*a*. That is, three layers, a stack constituent element 3*e*L having a low thermal conductivity, a stack constituent element 3*e*H having a high thermal conductivity, and a stack constituent element 3*e*L having a low thermal conductivity, are provided in that order from the second high-temperature side heat exchanger 6 side. In addition, the stack constituent element 3*e*H having a high thermal conductivity is formed thicker than the stack constituent element 3*e*L having a relatively low thermal conductivity. The second heat exchanger 310 formed as described above is provided in the vicinity of a position in the loop tube 2 at which the phase of change in acoustic particle velocity is the same as the phase of change in sound pressure, as shown in FIG. 4.

Inside this loop tube 2, an inert gas, such as helium or argon, is sealed. Besides the inert gases as mentioned above, a working fluid, such as nitrogen or air, may also be sealed. The pressure of the working fluid is set in the range of 0.01 to 5 MPa.

In the case in which the working fluid as described above is sealed, when helium or the like, having a small Prandtl number and also having a small specific gravity, is used, the time for generating an acoustic wave can be decreased. However, when the working fluid as described above is used, the acoustic velocity is increased, and as a result, heat exchange with stack inside walls cannot be well performed. On the other hand, when argon or the like, having a large Prandtl number and also having a large specific gravity, is used, since the viscosity is increased this time, and as a result, an acoustic wave cannot be rapidly generated. Hence, a mixed gas of helium and argon is preferably used. The mixed gas mentioned above is sealed as described below.

First, helium having a small Prandtl number and also having a small specific gravity is sealed in the loop tube 2, so that an acoustic wave is rapidly generated. Subsequently, in order to decrease the acoustic velocity of the generated acoustic wave, a gas, such as argon, having a large Prandtl number and also having a large specific gravity is injected. When this argon is mixed, as shown in FIG. 1, a helium gas injection device 9*a* and an argon gas injection device 9*b* are provided at a central portion of the connection tube portion 2*b* formed at an upper side, and argon is injected therefrom. Accordingly, argon equally flows into the right-side and the left-side straight tube portions 2*a* and are then mixed with helium present inside. The pressure of the mixed gas described above is set in the range of 0.01 to 5 MPa.

Next, operation of the thermoacoustic device 1 thus configured will be described.

First, helium is sealed in the loop tube 2 using the helium gas injection device 9*a*, and in this state, water is circulated in an outer peripheral portion of the first low-temperature side heat exchanger 5 of the first heat exchanger 300 and that of the second high-temperature side heat exchanger 6 of the second heat exchanger 310. In the above state, the first high-temperature side heat exchanger 4 of the first heat exchanger 300 is heated to approximately 600° C., and in addition, the first low-temperature side heat exchanger 5 is set to approximately 15 to 16° C. As a result, heat is transported from the first high-temperature side heat exchanger 4 to the first low-temperature side heat exchanger 5. At this stage, the heat from the first high-temperature side heat exchanger 4 is transported to the first low-temperature side heat exchanger 5 via a member of the first stack 3*a*; however, this heat transportation is inhibited by the presence of the stack constituent elements 3*e*L having a low thermal conductivity. Hence, the difference in temperature between the first high-temperature side heat exchanger 4 and the first low-temperature side heat exchanger 5 can be increased. On the other hand, the heat (600° C.) of this first high-temperature side heat exchanger 4 is transported to the first low-temperature side heat exchanger 5 side by the working fluid present in the communication paths 30 of the first stack 3*a*. Accordingly, the temperature gradient is formed between the first high-temperature side heat exchanger 4 and the first low-temperature side heat exchanger 5, and by this temperature gradient generated in this working fluid, wobbling thereof is generated, so that an acoustic wave is generated while heat exchange is performed with the first stack 3*a*. At this stage, large heat exchange is performed with the stack constituent element 3*e*H which is relatively thick and which has a high thermal conductivity, and the acoustic wave is rapidly generated, so that the heat exchange efficiency is improved. The acoustic wave thus generated is transported as acoustic energy by the standing and traveling waves to the second heat exchanger 310 side. This acoustic energy is transported based on the energy conservation law in a direction opposite to that of transportation of the thermal energy in the first heat exchanger 300 (from the first high-temperature side heat exchanger 4 to the first low-temperature side heat exchanger 5), that is, in a direction from the first low-temperature side heat exchanger 5 to the first high-temperature side heat exchanger 4.

Subsequently, immediately after the standing and traveling waves are generated, argon is injected from the argon gas injection device 9*b* provided at the upper side of the connection tube portion 2*b* so that the pressure is set at a predetermined value, thereby improving the heat exchange efficiency.

Next, at the second heat exchanger 310 side, based on the standing and traveling waves, the working fluid in the communication paths 30 of the second stack 3*b* is expanded and contracted. Thermal energy which is heat-exchanged at this stage is transported in a direction opposite to the transportation direction of the acoustic energy, that is, in a direction from the second low-temperature side heat exchanger 7 to the second high-temperature side heat exchanger 6 side. At this stage, high heat is accumulated at the second high-temperature side heat exchanger 6 side, and low heat is accumulated at the second low-temperature side heat exchanger 7 side. Subsequently, by the difference in temperature described above, the high heat is transported to the second low-temperature side heat exchanger 7 side via the second stack 3*b*; however, since the stack constituent elements 3*e*L having a low thermal conductivity are provided at the second high-temperature side heat exchanger 6 and the second low-temperature side heat exchanger 7 sides, the heat transportation is inhibited. Accordingly, the temperature of the second low-temperature side heat exchanger 7 can be further decreased, and hence an object to be cooled can be further cooled.

According to the embodiment described above, in the first heat exchanger 300 including the first stack 3*a* formed of the stack constituent elements 3*e*L and 3*e*H laminated together, the first high-temperature side heat exchanger 4 provided at one end of the first stack 3*a*, and the first low-temperature side heat exchanger 5 provided at the other end of the stack 3*a*, in which the temperature gradient is generated in the communication paths 30 of the first stack 3*a* by the temperature difference generated between the first high-temperature side heat exchanger 4 and the first low-temperature side heat exchanger 5 so as to generate an acoustic wave, since the two ends of the first stack 3*a* are formed of the stack constituent elements 3*e*L having a low thermal conductivity, and between the stack constituent elements 3*e*L having a low thermal conductivity, the stack constituent element 3*e*H having a relatively high thermal conductivity is provided, transportation of heat obtained by heating in the first high-temperature side heat exchanger 4 to the first low-temperature side heat exchanger 5 side via the member of the first stack 3*a* can be suppressed, and hence the difference in temperature between the first high-temperature side heat exchanger 4 and the first low-temperature side heat exchanger 5 can be increased. Since the temperature gradient is increased thereby, the standing and traveling waves can be rapidly generated, and as a result, the heat exchange efficiency can be improved.

In addition, in the second heat exchanger 310, since the stack constituent elements 3*e*L having a low thermal conductivity form the two ends of the second stack 3*b*, when thermal energy is converted to acoustic energy, transportation of high heat from the second high-temperature side heat exchanger 6 side to the second low-temperature side heat exchanger 7 side can be suppressed; hence, the cooling temperature of the second low-temperature side heat exchanger 7 can be further decreased, and an exterior object to be cooled can be further cooled.

In addition, in the present invention, since the stack constituent element 3*e*H having a high thermal conductivity is formed thicker than the stack constituent element 3*e*L having a low thermal conductivity, it is possible to increase an area in which heat exchange can be performed with the working fluid present in the communication paths 30; hence, an acoustic wave can be rapidly generated, and the heat exchange efficiency can be improved.

Furthermore, since the stack constituent elements 3*e*L and 3*e*H are laminated together with a holding force generated between the first high-temperature side heat exchanger 4 and the first low-temperature side heat exchanger 5, and the stack constituent elements 3*e*L and 3*e*H are laminated together with a holding force generated between the second high-temperature side heat exchanger 6 and the second low-temperature side heat exchanger 7, compared to the case in which the stack constituent elements 3*e*L and 3*e*H are laminated using an adhesive or the like, a problem in that the communication paths 30 are blocked with an adhesive which overflows can be prevented.

In addition, as another embodiment in which the stack constituent elements 3*e*L and 3*e*H are laminated together, since the stack constituent elements 3*e*L and 3*e*H are laminated together by their own weights, the widths of the first high-temperature side heat exchanger 4 and the first low-temperature side heat exchanger 5 are not strictly set to be equal to that of the first stack 3*a*, and hence the stack constituent elements 3*e*L and 3*e*H can be easily laminated together.

The present invention is not limited to the above embodiment, and various embodiments may be performed without departing from the spirit and the scope of the present invention.

For example, in the above embodiment, although the first heat exchanger 300 and the second heat exchanger 310 are each provided at one position, the structure is not limited to that described above, and as a thermoacoustic device 1*a* shown in FIG. 5, the first heat exchangers 300 and the second heat exchangers 310 may be provided at a plurality of positions in the loop tube 2. In this case, the first heat exchangers 300 and the second heat exchangers 310 are preferably provided in the loop tube 2 in the vicinities of positions at which the phase of change in acoustic particle velocity is the same as the phase of change in sound pressure.

Furthermore, in the above embodiment, the thermoacoustic device 1 in which the second stack 3*b* side is cooled by heating the first stack 3*a* side is described by way of example; however, in a manner opposite thereto, by cooling the first stack 3*a* side, the second stack 3*b* side may be heated. An example of this thermoacoustic device 1 is shown in FIG. 6.

In FIG. 6, the same reference numerals as in the above embodiment indicate elements having the same structures as described above. A thermoacoustic device 1*b* of this embodiment has the first heat exchanger 300 and the second heat exchanger 310, as is the first embodiment. In addition, in this embodiment, the first low-temperature side heat exchanger 5 is cooled to minus several tens of degrees or less, and at the same time, a nonfreezing solution is circulated in the first high-temperature side heat exchanger 4 and the second low-temperature side heat exchanger 7. As a result, by the law of the thermoacoustic effect, a self-excited acoustic wave is generated by the temperature gradient formed in the first stack 3*a*. Acoustic energy of the standing and traveling waves is generated in a direction opposite to the transportation direction (direction from the first high-temperature side heat exchanger 4 to the first low-temperature side heat exchanger 5) of thermal energy in the first stack 3*a*. The acoustic energy by the standing and traveling waves is transported to the second stack 3*b* side, and at the second stack 3*b* side, and a working fluid is repeatedly expanded and contracted by the pressure change and the volume change thereof based on the standing and traveling waves. Thermal energy generated at this stage is transported in a direction from the second low-temperature side heat exchanger 7 to the second high-temperature side heat exchanger 6 side, that is, in a direction opposite to the transportation of the acoustic energy. As described above, the second high-temperature side heat exchanger 6 is heated.

In addition, in the above embodiment, the standing and traveling waves are generated in the loop tube 2; however, when the intensities of the standing and traveling waves are increased, an acoustic streaming, convection of a working fluid, and the like are generated, and as a result, heat of the first heat exchanger 300 is transported to the second heat exchanger 310 side via the working fluid. And, as a result, the temperature of the second low-temperature side heat exchanger 7 is increased, and the heat exchange efficiency may be degraded in some cases. In order to avoid the problem described above, for example, a speaker, a piezoelectric film, or a resonator may be provided which generates an acoustic wave in a direction opposite to that of an acoustic streaming and/or a direct-current type flow, such as convection, of the working fluid.

In addition, in the above embodiment, the first stack 3*a* and the second stack 3*b* each have the structure in which the stack constituent elements 3*e*L and 3*e*H are laminated together; however, one of the stacks may have a laminated structure, and the other stack may have a non-laminated structure.

REFERENCE NUMERALS

Figure 1:
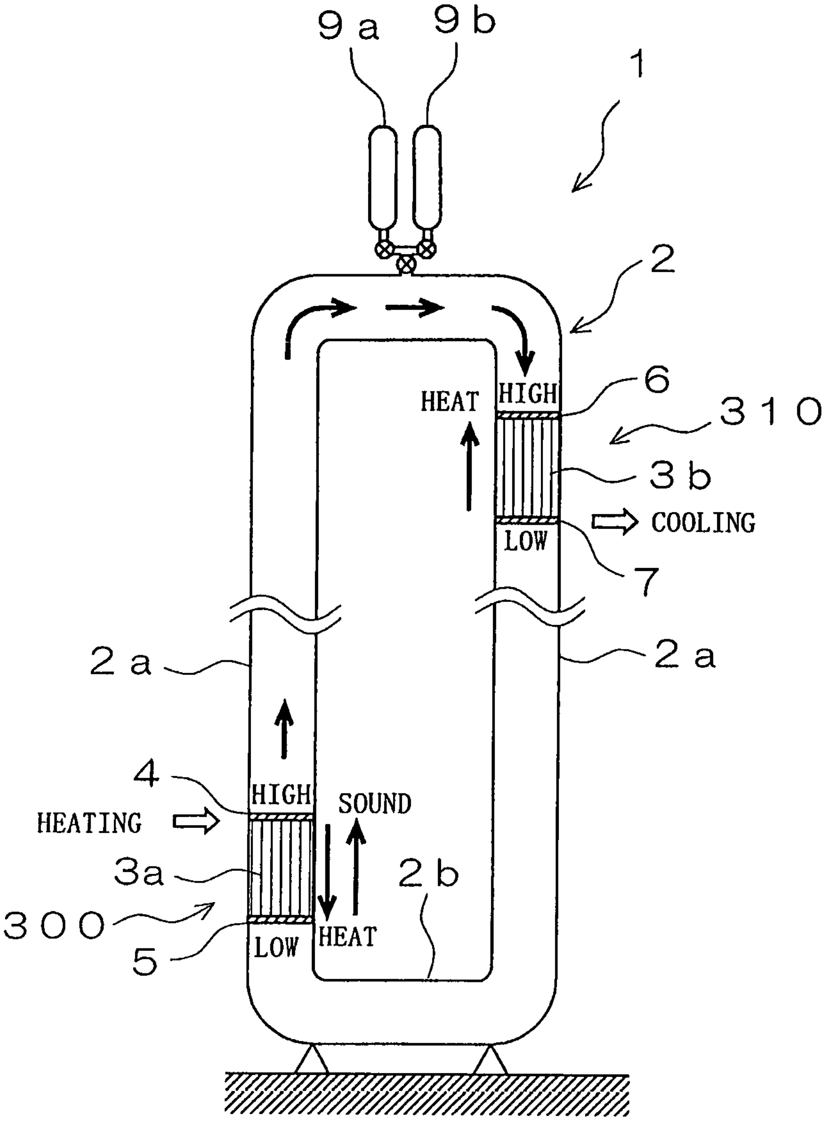
FIG. 1 is a schematic view of a thermoacoustic device showing one embodiment according to the present invention.
Figure 2:
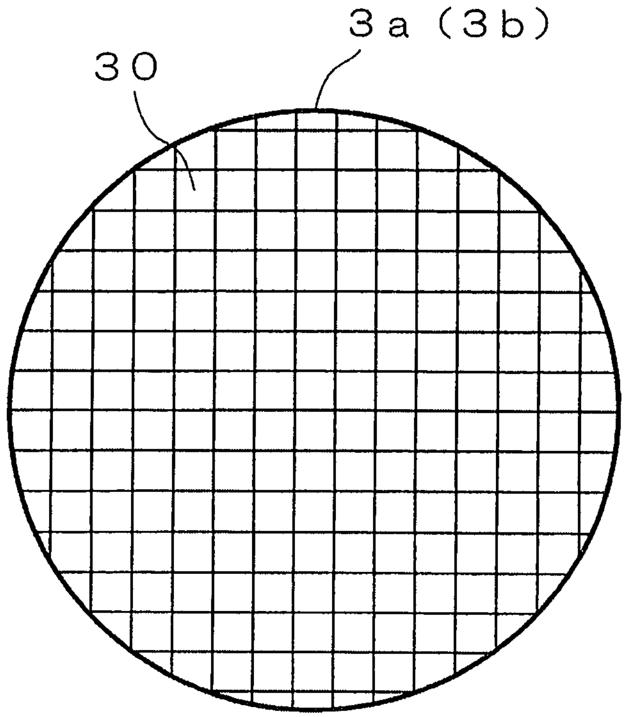
FIG. 2 is a view of a stack according to the above embodiment, when viewed along an axial direction.
Figure 3:
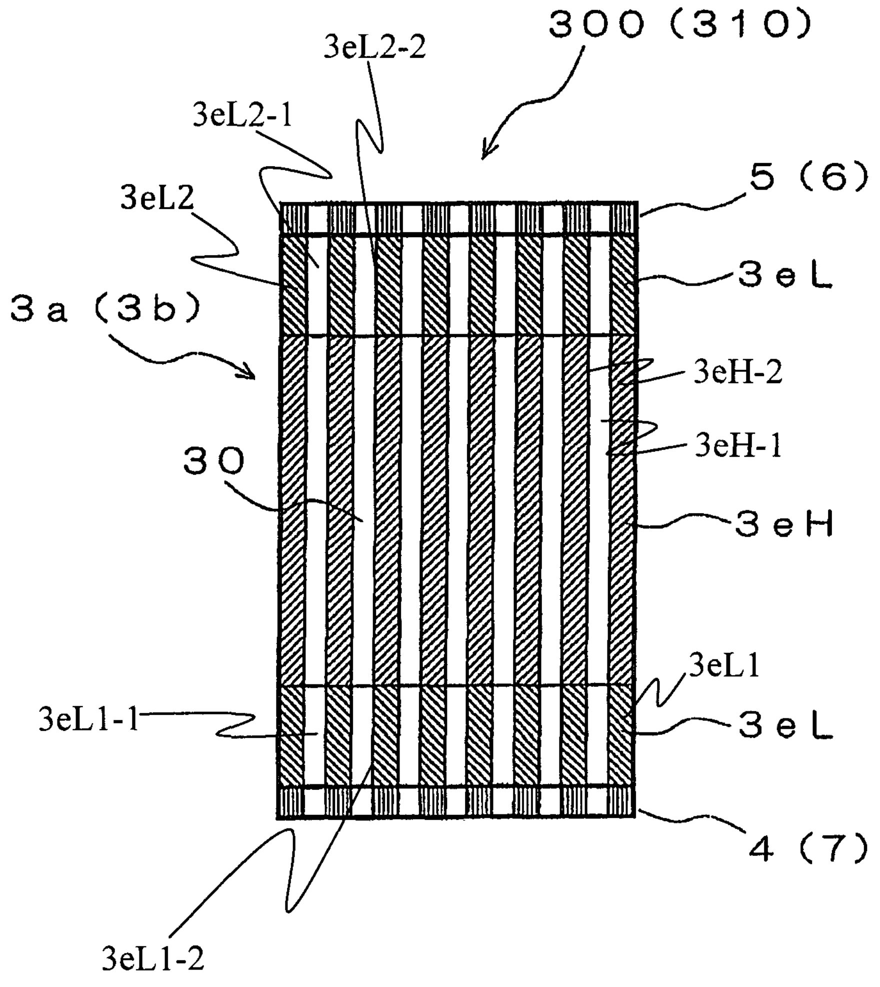
FIG. 3 is cross-sectional view of the stack according to the above embodiment.
Figure 4:
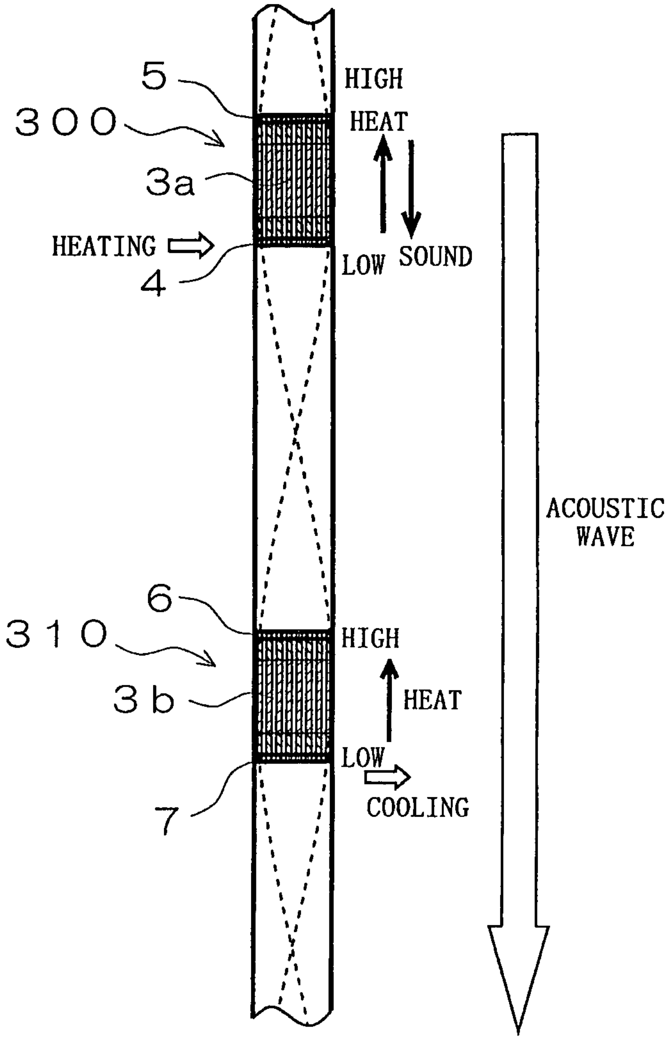
FIG. 4 is a view showing the relationship of positions of a first heat exchanger and a second heat exchanger with a position at which the phase of change in acoustic particle velocity is the same as the phase of change in sound pressure.
Figure 5:
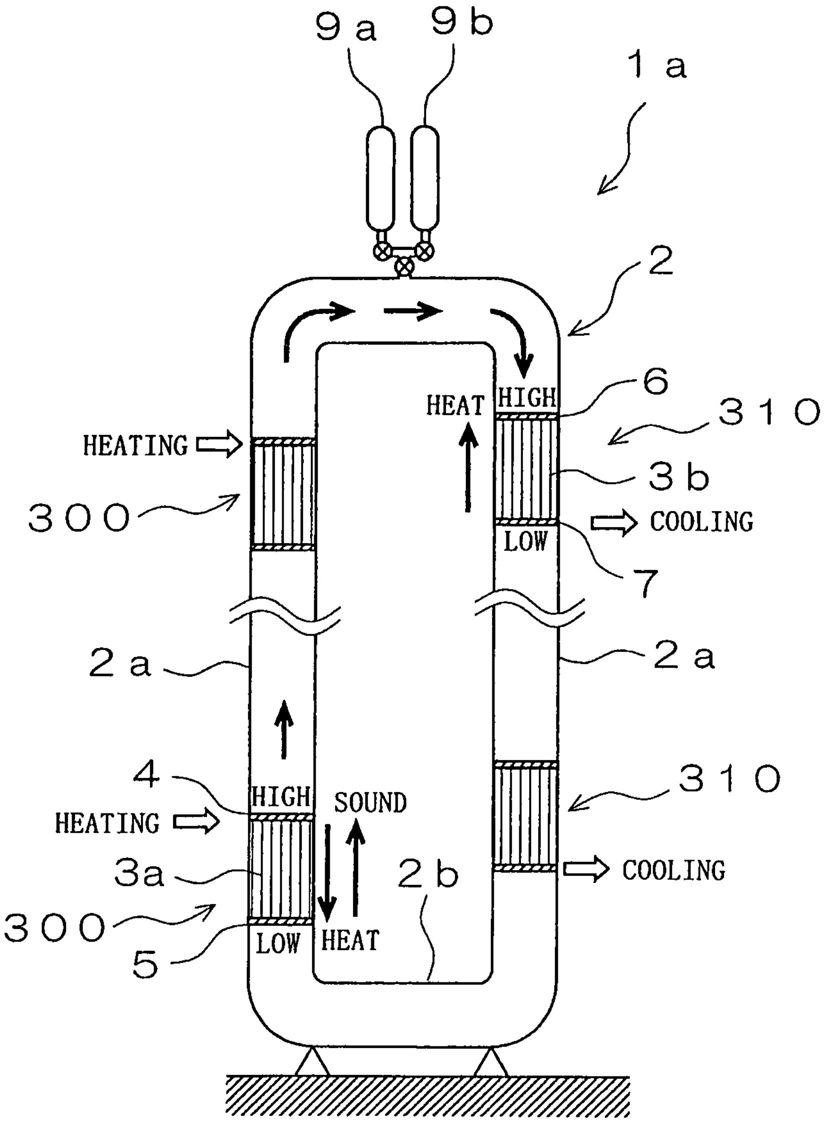
FIG. 5 is a schematic view of a thermoacoustic device according to another embodiment.
Figure 6:
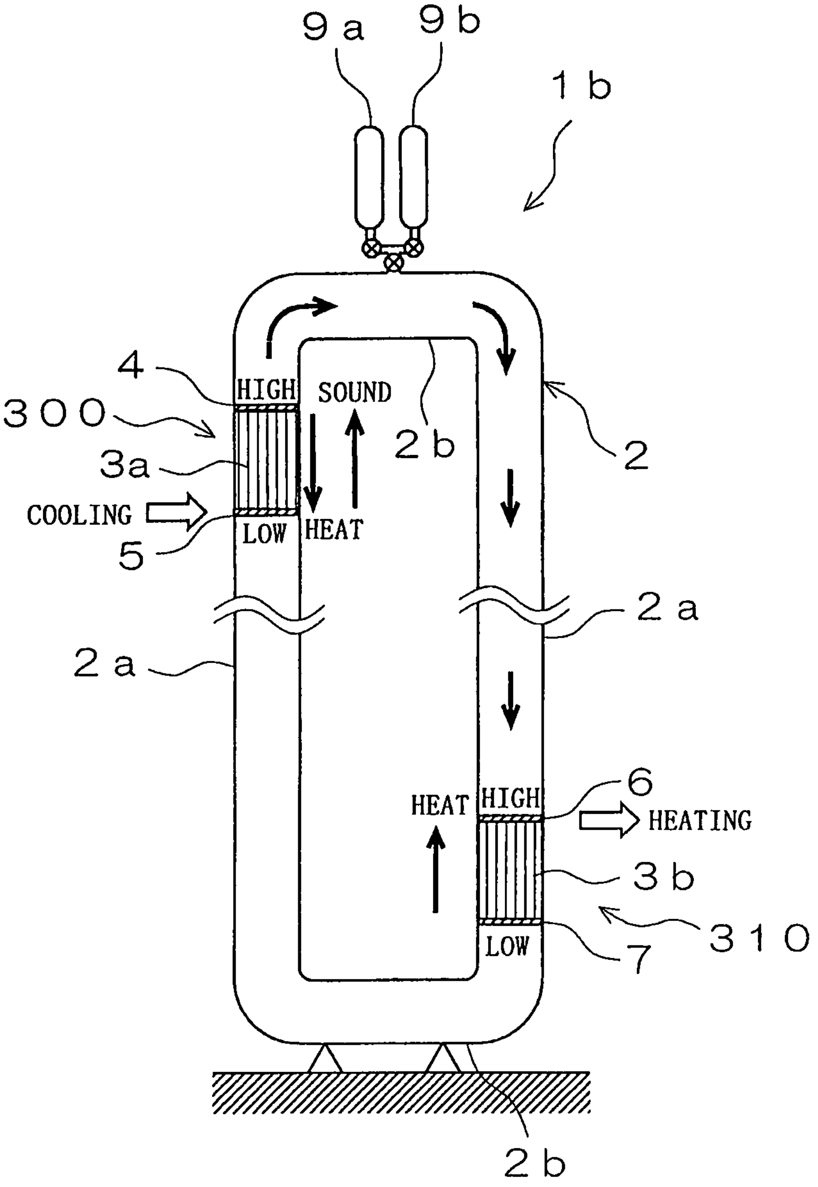
FIG. 6 is a schematic view of a thermoacoustic device according to another embodiment.

1 . . . thermoacoustic device
2 . . . loop tube
2*a* . . . straight tube portion
2*b* . . . connection tube portion
3*a* . . . first stack
3*b* . . . second stack
3*e*L . . . stack constituent element having a low thermal conductivity
3*e*H . . . stack constituent element having a high thermal conductivity
30 . . . communication path
4 . . . first high-temperature side heat exchanger
5 . . . first low-temperature side heat exchanger
6 . . . second high-temperature side heat exchanger
7 . . . second low-temperature side heat exchanger
300 . . . first heat exchanger
310 . . . second heat exchanger

The invention claimed is:

1. A heat exchanger comprising:
a high-temperature side heat exchanger;
a stack comprising:
a first stack constituent element on the high-temperature side heat exchanger, the first stack constituent element having a first communication path with a first inner wall;
a second stack constituent element above the first stack constituent element, the second stack constituent element having a second communication path with a second inner wall; and
a third stack constituent element above the second stack constituent element, the third stack constituent element having a third communication path with a third inner wall, wherein the first inner wall, the second inner wall and the third inner wall extend as a single straight channel; and
a low-temperature side heat exchanger provided on the third stack constituent element,
in which a temperature gradient is generated in the first, second and third communication paths by a temperature difference generated between the high-temperature side heat exchanger and the low-temperature side heat exchanger, and an acoustic wave is generated from the stack,
wherein the first and the third stack constituent elements have a low thermal conductivity, and the second stack constituent element has a relatively high thermal conductivity.

2. A heat exchanger comprising:
a high-temperature side heat exchanger;
a stack comprising:
a first stack constituent element on the high-temperature side heat exchanger, the first stack constituent element having a first communication path with a first inner wall;
a second stack constituent element above the first stack constituent element, the second stack constituent element having a second communication path with a second inner wall; and
a third stack constituent element above the second stack constituent element, the third stack constituent element having a third communication path with a third inner wall, wherein the first inner wall, the second inner wall and the third inner wall extend as a single straight channel; and
a low-temperature side heat exchanger provided at the third stack constituent element, in which a temperature gradient is generated between the high-temperature side heat exchanger and the low-temperature side heat exchanger by inputting an acoustic wave in the stack, and heat is output outside from the high-temperature side heat exchanger or the low-temperature side heat exchanger,
wherein the first and the third stack constituent elements have a low thermal conductivity, and the second stack constituent element has a relatively high thermal conductivity.

3. The heat exchanger according to claim 1 or 2, wherein the second stack constituent element having the high thermal conductivity has a thickness larger than that of the first and the third stack constituent elements having the low thermal conductivity.

4. The heat exchanger according to claim 1 or 2, wherein the first, the second and third stack constituent elements are laminated together with a holding force generated between the high-temperature side heat exchanger and the low-temperature side heat exchanger.

5. The heat exchanger according to claim 1 or 2, wherein the first, the second and third stack constituent elements are laminated together by their own weights.

6. A thermoacoustic device comprising in a loop tube:

a first stack provided between a first high-temperature side heat exchanger and a first low-temperature side heat exchanger; and a second stack provided between a second high-temperature side heat exchanger and a second low-temperature side heat exchanger, in which self-excited standing and traveling waves are generated by heating the first high-temperature side heat exchanger, or in which self-excited standing and traveling waves are generated by cooling the first low-temperature side heat exchanger, each of the first stack and second stack comprising:

a first stack constituent element on the first or second high-temperature side heat exchanger, the first stack constituent element having a first communication path with a first inner wall;

a second stack constituent element above the first stack constituent element, the second stack constituent element having a second communication path with a second inner wall; and a third stack constituent element above the second stack constituent element, the third stack constituent element having a third communication path with a third inner wall, wherein the first inner wall, the second inner wall and the third inner wall extend as a single straight channel; and wherein first and third stack constituent elements have a low thermal conductivity, and a second stack constituent element has a relatively high thermal conductivity.

* * * * *